US006074193A

United States Patent [19]

Kratky et al.

[11] Patent Number: 6,074,193

[45] Date of Patent: Jun. 13, 2000

[54] APPARATUS FOR FABRICATING CHIPBOARDS OR FIBER BOARDS OF CELLULOSE MATERIAL

[75] Inventors: Josef Kratky, Werther; Werner Pankoke, Blelefeld, both of Germany; Steinar Storruste, Oslo, Norway

[73] Assignee: Firma Theodor Hymmen, Bielefeld, Germany

[21] Appl. No.: 09/046,438

[22] Filed: Mar. 24, 1998

[30] Foreign Application Priority Data

Mar. 25, 1997 [DE] Germany ........................... 197 12 440

[51] Int. Cl.[7] ..................................................... B29C 43/48

[52] U.S. Cl. ......................... 425/371; 425/81.1; 264/108; 264/112

[58] Field of Search ................................. 425/81.1, 83.1, 425/335, 371, 130, 197; 264/108, 112, 113

[56] References Cited

U.S. PATENT DOCUMENTS

| | | | |
|---|---|---|---|
| 1,060,122 | 4/1913 | Prosig | 425/371 |
| 3,427,372 | 2/1969 | Berner | 425/371 |
| 4,258,455 | 3/1981 | Werner | 425/83.1 |
| 4,298,418 | 11/1981 | Takagi | 425/371 |
| 5,185,115 | 2/1993 | Thole | 425/371 |
| 5,458,477 | 10/1995 | Kemerer et al. | 425/371 |
| 5,695,599 | 12/1997 | Pankoke | 425/371 |
| 5,776,511 | 7/1998 | Miki et al. | 425/371 |
| 5,863,566 | 1/1999 | Wood et al. | 425/363 |

*Primary Examiner*—Robert Davis
*Assistant Examiner*—Thukhanh T. Nguyen
*Attorney, Agent, or Firm*—Henry M. Feiereisen

[57] ABSTRACT

Apparatus for fabricating chip boards or fiber boards of cellulosic material, includes a press, and a press form station arranged upstream of the press and having a storage bin for retaining a material in the form of chips or fibers and a conveyor belt arrangement extending from an outlet end of the storage bin to a receiving end of the press, with the conveyor belt arrangement including a first section forming a vertical, funnel-shaped compaction zone aNd a second arcuate section arranged downstream of the first section for deflecting the material along a curved path from a vertical disposition into a horizontal disposition.

16 Claims, 4 Drawing Sheets

APPARATUS FOR FABRICATING CHIPBOARDS OR FIBER BOARDS OF CELLULOSE MATERIAL

BACKGROUND OF THE INVENTION

The present invention relates to an apparatus for fabricating chipboards or fiber boards of cellulose material, such as wood, straw, reed, cotton stems, paper or the like, by means of a continuously or discontinuously, operating press.

In the fabrication of cellulose fiber boards or cellulose chipboards, the formation of a material mat before carrying out the actual pressing operation and hardening of the boards strands is crucial. In this context, the standards that have to be met by a material spreading station with respect to size accuracy, i.e. width, length and thickness of the mat and distribution of differently sized chips within the mat as well as angular position of the chips with respect to the main surface of the board are high.

These standards are even further heightened through the emergence of continuously operating board presses and the associated considerable material saving (reduced grinding allowance and reduced sawing waste). However, a double belt press has only very limited capability to compensate e.g. significant size variations encountered when chips or fibers are incorrectly spread onto the press.

Spreading stations are known which fabricate the fiber mat or the chip mat mechanically on a continuously advanced spreading band by means of discharge drums (gravity-type spreading process) or through use of blowers (wind-type spreading process). In order to meet the standards, as referred to above, bulky and complex machines have been developed. In all cases, various storage bins are provided which have an outlet opening above the plane of the spreader band for discharge of chips which drop in free fall onto the spreader band on which the chips orient under the influence of gravity substantially parallel to the conveying direction of the band and thus parallel to the main surface of the board being fabricated. This alignment is retained on continuously or discontinuously operating presses in flat press operation because the pressing force is applied perpendicular to the main surface of the pressed strand, with the scattered particles being aligned perpendicular to the pressing force and thus parallel to the main surface. As a consequence, the chipboards exhibit a high bending strength.

In conventional extrusion processes, the chips are pressed by an oscillating plunger through a die passage, with the force applied by the plunger acting in conveying direction. The chips are oriented perpendicular to the piston force and thus perpendicular to the main surface of the pressed strand so that the extruded boards are afforded a high tensile strength in transverse direction but only a slight bending strength.

SUMMARY OF THE INVENTION

It is thus an object of the present invention to provide an improved apparatus for fabricating chipboards or fiber boards of cellulose material, obviating the afore-stated drawbacks.

In particular, it is an object of the present invention to provide an improved apparatus for fabricating chipboards or fiber boards of cellulose material, which apparatus is of simple nature but yet capable of producing boards of high bending strength as well as high transversal tensile strength.

These objects, and others which will become apparent hereinafter, are attained in accordance with the present invention by providing a press form station arranged upstream of a receiving end of a press and having a storage bin for retaining a material in the form of chips or fibers and a conveyor belt arrangement in the form of two conveyor belts extending from an outlet end of the storage bin to the receiving end of the press, with the conveyor belt arrangement including a first section forming a vertical, funnel-shaped compaction zone and a second arcuate section arranged downstream of the first section for deflecting the material along a curved path from a vertical disposition into a horizontal disposition.

Through the provision of a press form station according to the present invention by which the material web is laterally deflected from a vertical disposition into a horizontal disposition, a free fall of chips or fibers is eliminated. The flow of material from the outlet end of the storage bin is forced through the conveyor belt arrangement which forms a compaction zone for preliminary compressing the scattered material for formation of a chip mat or fiber mat while at the same time effecting a directional alignment of the chips or fibers. The outer layers of the mat, adjacent the conveyor belts, contain material aligned substantially parallel to a conveying direction while the center layer trapped between the outer layers is formed by randomly positioned material which is aligned to a major degree perpendicular to the conveying direction. The different orientation of the chips or fibers in the outer layers and the central layer of the mat produced in the pre-compaction zone is maintained during further advance of the mat from the vertical disposition into the horizontal disposition until transferred to the receiving end of the press.

Although based on experiences in conjunction with extrusion processes, experts may have concluded that a material mass which is subject to pressure would result in a chip alignment perpendicular to the main surface of the boards being fabricated and thus lead to reduced bending strength, it has been surprisingly found that the arrangement of a press form station upstream of the press and configured in accordance with the present invention results in outer layers in which the chips under the influence of various forces align approximately parallel to the main surface while the central layer of the mat contains randomly oriented chips or fiber, with a major part of the chips or fibers being oriented perpendicular to the conveying direction. Thus, the provision of a press form station according to the present invention enables the fabrication of a board from a single material fraction with superior bending strength and transversal tensile strength in a simple fashion.

Preferably, the press form station includes two endless belts in opposite disposition which extend between the outlet end of the storage bin to the receiving end of the press, or may be extended to form at the same time two opposing walls of the storage bin. Suitably, the running speed of the conveyor belts is infinitely variable.

According to another feature of the present invention, the storage bin may have accommodated therein vertical partitions to define compartments that allow filling of different material fractions. The press form station nay also include a sorting unit, e.g. a screen having apertures of different diameter, accommodated in the storage bin adjacent the outlet opening.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
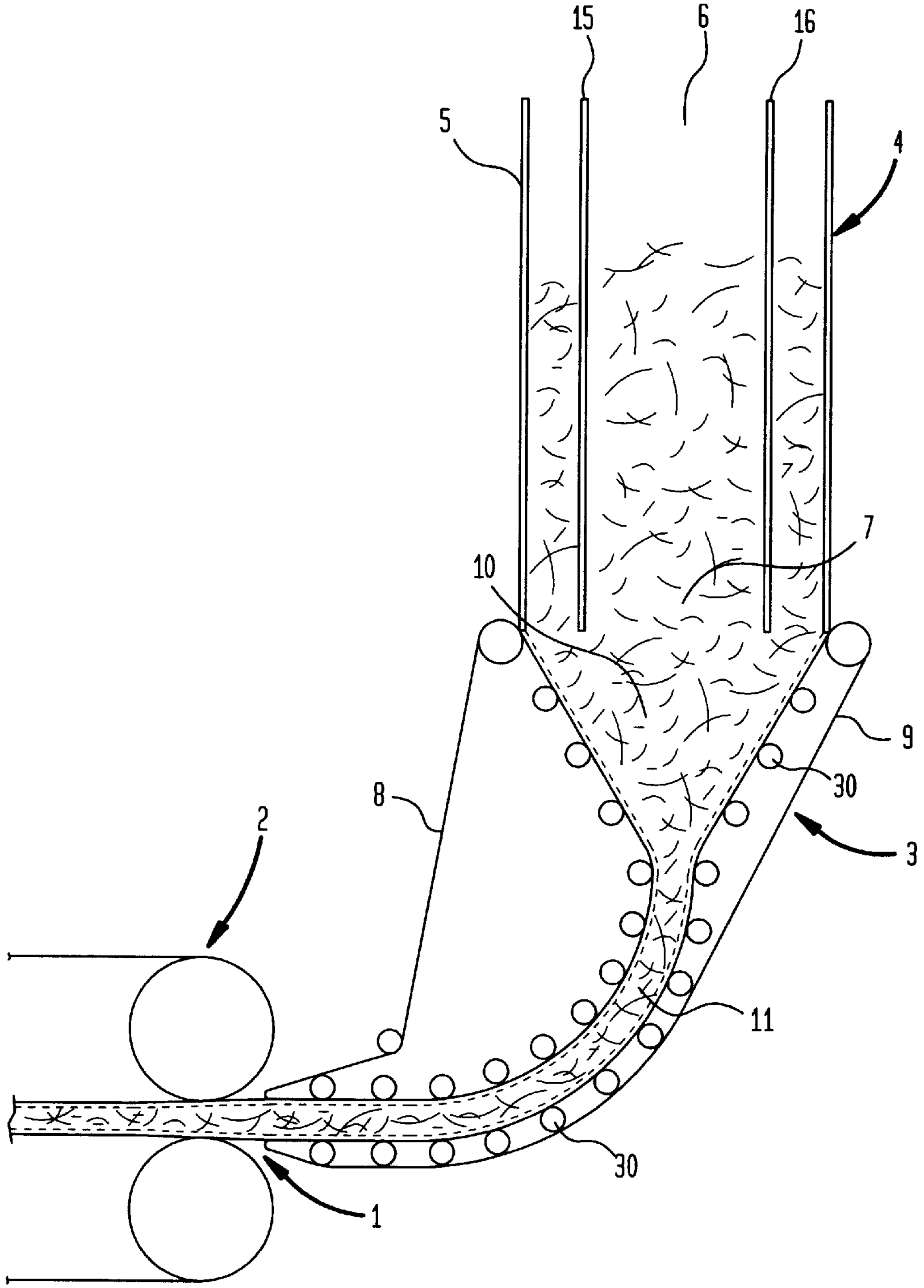
FIG. 1 is a schematic illustration of one embodiment of a press form station according to the present invention arranged upstream of a double belt press.

Throughout all the Figures, same or corresponding elements are generally indicated by same reference numerals.

Turning now to the drawing, and in particular to FIG. 1, there is shown a schematic illustration of one embodiment of a pre-press or press form station according to the present invention, generally designated by reference numeral 3 and arranged upstream of a double belt press, generally designated by reference numeral 2 and including a receiving end indicated by reference numeral 1. The press form station 3 includes a storage bin 4 containing chips or fibers and having walls 5 to define an upper filling opening 6 and a lower outlet opening 7. Suitably, one of the walls 5, e.g. the front wall, of the storage bin 4 may be made of transparent material to allow an operator to easy monitor and control the filling level of chips or fibers.

Extending between the outlet opening 7 of the storage bin 4 and the receiving end 1 of the double belt press 2 is a conveyor belt arrangement in the form of two endless conveyor belts 8, 9 which define together a first section which forms a vertical, funnel-like compaction zone 10 and extends from adjacent the outlet opening 7 to a second arcuate section 11 for deflecting the formed material strand (formed chip mat or fiber mat) from a vertical disposition to a horizontal disposition. As shown in FIG. 1, the conveyor belts 8, 9 run on guide rollers 30 which converge in the compaction zone 10 to effect the funnel-like configuration and are lined along a curved path in the arcuate section 11 so that the material strand is curved sideways into a horizontal disposition when exiting the press form station and entering the double belt press 2, while pressure applied on the chip mat or fiber mat is maintained during deflection into the horizontal and entering the double belt press 2. Persons skilled in the art will understand that use of other types of presses may equally be possible, such as e.g. an intermittently operating press.

The press form station 3 is thus comprised in the compaction zone 10 and the arcuated zone 11 of both endless belts 8, 9, with suitable coverings (not 17 shown) attached at the end faces between the conveyor belts 8, 9.

Figure 3:
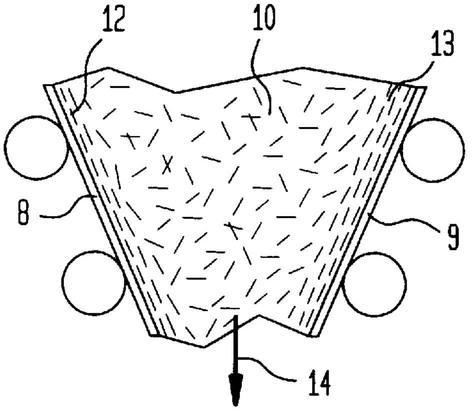
FIG. 3 is a cutaway view of an area marked III in FIG. 2 showing in detail the orientation of chips or fibers in the compaction zone.

Material such as chips or fibers exiting the storage bin 4 is so directed by the funnel-shaped compaction zone 10 as to effect in the outer layers in an area adjacent the working run of the belts 8, 9 an alignment of the material in a substantially parallel disposition with respect to the working run of the conveyor belts 8, 9, while chips or fibers in the center layer trapped between the outer layers although randomly directed is mostly oriented substantially perpendicular to the conveying direction 14 (FIG. 3).

Thus, it is possible to fabricate from the chips or fibers in the storage bin 4 chip mats or fiber mats which are comprised of three layers. These three layers are also formed in the finished board which is produced from the chip mat or fiber mat through heat application and pressure application in the double belt press, and utilized e.g. in the furniture industry or construction industry. While the outer layers of such boards exhibit high bending strength, the central layer ensures a high transversal tensile strength.

It will be appreciated by persons skilled in the art that the double belt press 2 must contain much mechanical apparatus which does not appear in the foregoing Figures, e.g. means for applying heat. However, this apparatus, like much other necessary apparatus, is not part of the invention, and has been omitted from the Figures for the sake of simplicity.

The storage bin 4 further accommodates interiorly partitions 15, 16 in parallel relationship to the walls 5 to form two outer compartments in addition to the central compartment so that the storage bin 4 can be charged with three different fractions of chips or fibers. As a result, the layer structure of the chip mat or fiber mat can be additionally controlled.

The alignment of the chips or fibers during formation of the chip mat or fiber mat in the press form station 3 may also be influenced by providing the conveyor belts 8, 9 with a surface texture, e.g. fins or ribs or grooves.

Figure 2:
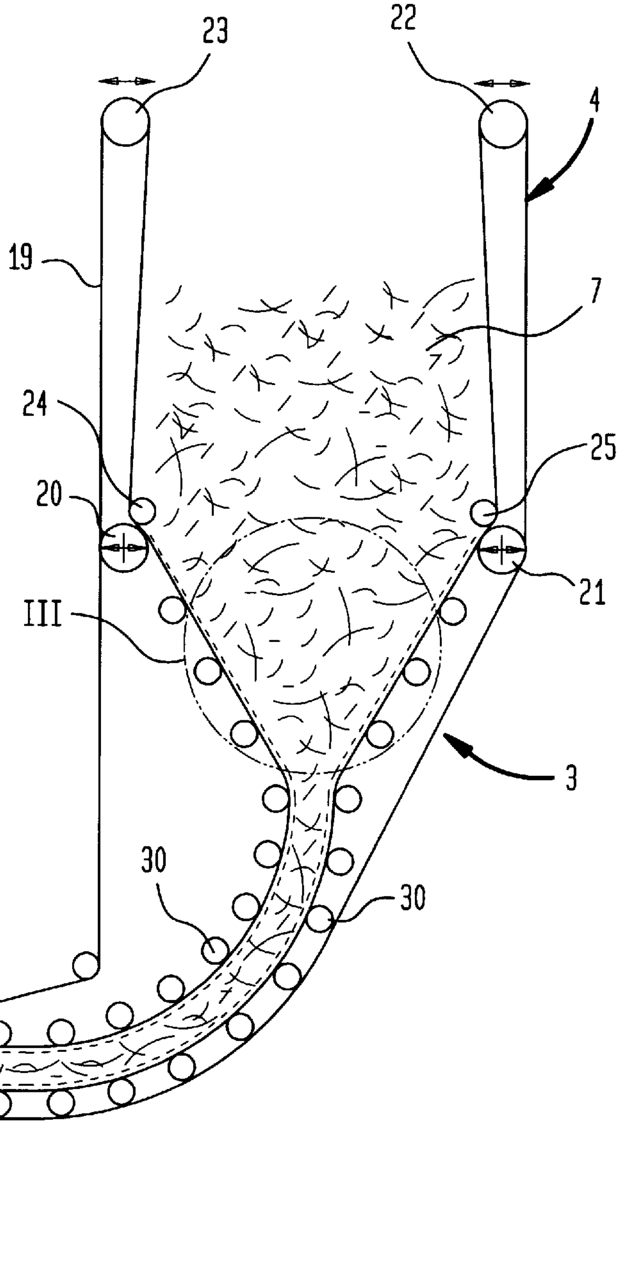
FIG. 2 is a schematic illustration of another embodiment of a press form station according to the present invention arranged upstream of a double belt press.

Turning now to FIG. 2, there is shown a schematic illustration of another embodiment of a press form station 3 which differs from the press form station of FIG. 1 in the configuration of the conveyor belt arrangement. As shown in FIG. 2, the press form station 3 includes conveyor belts 18, 19 which are, so extended to form walls of the storage bin 4 at the same time. Thus, the provision of separate walls 5, as shown in FIG. 1, is omitted. The conveyor belt 18 is guided about deflection rollers 21, 22 as well as 25, and the conveyor belt 19 is guided about deflection rollers 22, 23 as well as 24 whereby these deflection rollers may be so constructed that a displacement in horizontal direction is possible, as indicated by the double arrows, to thereby enable a continuous adjustment of the width of the storage bin 4 as well as of the compaction angle.

Although the guide and deflection means for directing the conveyor belt arrangement are shown as being rollers, it is certainly conceivable to provide non-movable formed parts.

Turning now to FIG. 3, there is shown a cutaway view of an area marked III in FIG. 2, depicting in detail the orientation of the chips or fibers in the compaction zone 10, with the outer layers 12, 13 of the mat and finished board having chips or fibers oriented primarily parallel to the working run of the endless belts 8, 9, while to a large extent the chips or fibers in the central layer are oriented perpendicular to the conveying direction 14.

Figure 4:
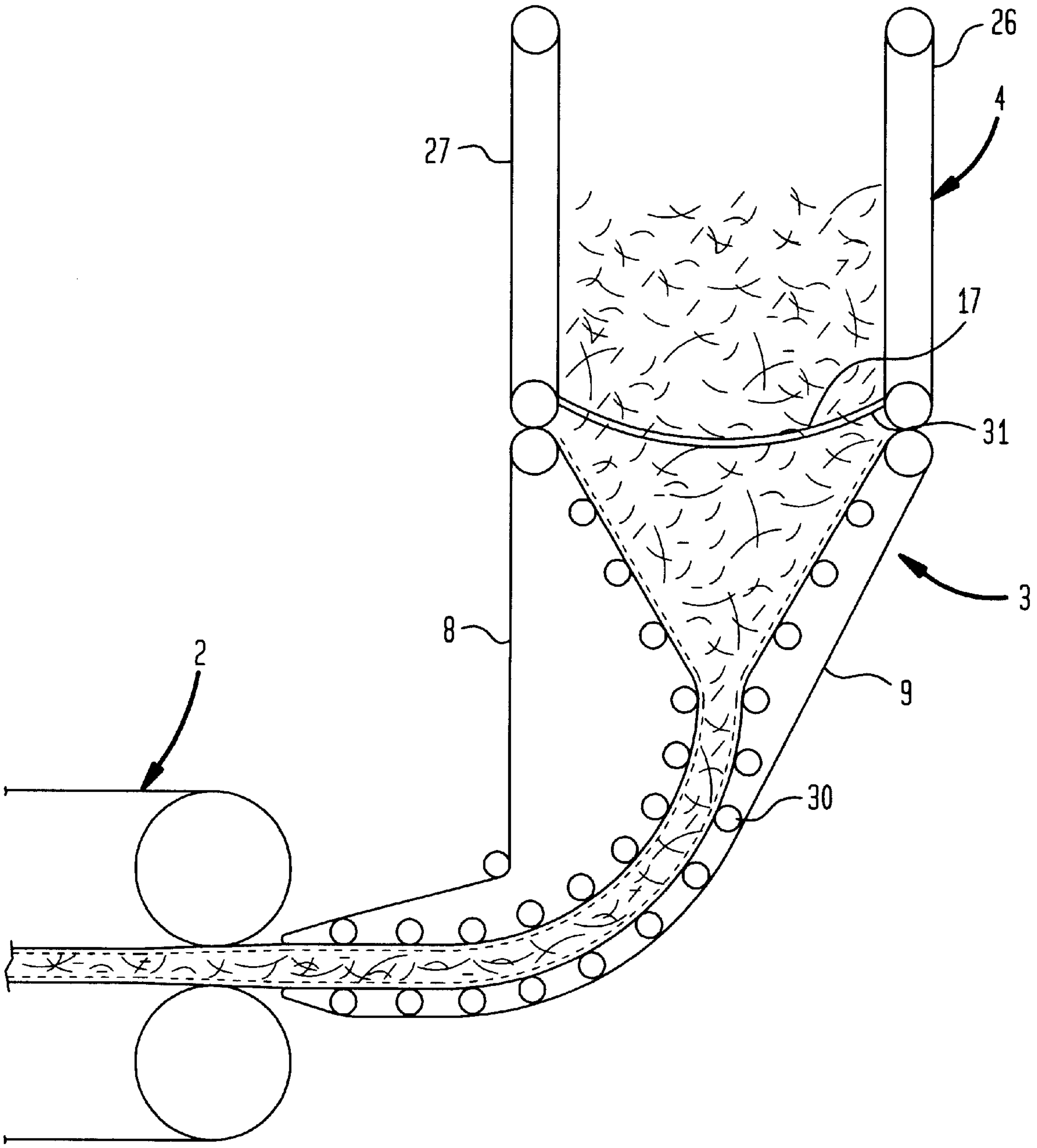
FIG. 4 is a schematic illustration of still another embodiment of a press form station according to the present invention arranged upstream of a double belt press.

FIG. 4 shows a schematic illustration of still another embodiment of a press form station 3 according to the present invention and arranged upstream of the double belt press 2. In the press form station 3 of FIG. 4, the walls of the storage bin 4 are formed by two separate endless conveyor belts 26, 27 in opposite parallel relationship. In the area of the outlet opening 7, the storage bin 4 is provided with a sorting unit, e.g. a screen 17 which has apertures 31 of different diameter in order to effect a sizing of the chip material or fiber material. Thus, smaller apertures may be formed in the outer screen zone to enable thinner and smaller chips to form in the outer layers 12, 13 while the remaining chip material may form the center layer of the mat.

Figure 5:
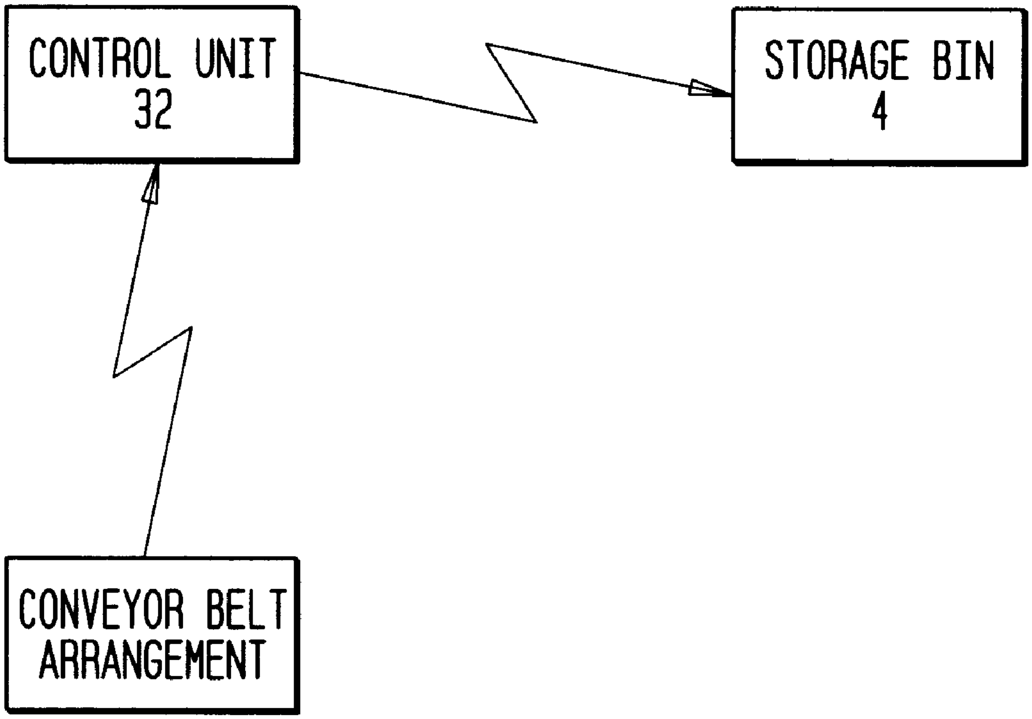
FIG. 5 is a schematic block diagram to show the interrelationship between the filling level of the storage bin and the speed of the conveyor belt arrangement.

Filling of the storage bin 4 is dependent on the speed of the circulating conveyor belts 8, 9. It is thus preferred to provide a control unit 32 for effecting a continuous adjustment of the conveyor belt arrangement to best suit the operation to prevailing conditions or needs, as shown schematically by the block diagram of FIG. 5. Although not shown in the drawing, the storage bin may be equipped with vibrators to improve emptying thereof. Persons skilled in the art will also understand that it is certainly possible to provide within the press form station, or upstream or downstream of the press form station 3, injectors for adding water, steam or catalysts (hardener). The material mat formed in the press form station may also be heated by hot air, superheated steam, hot plates, through microwave devices or high frequency devices.

While the invention has been illustrated and described as embodied in an apparatus for fabricating chipboards or fiber boards of cellulose material, it is not intended to be limited to the details shown since various modifications and structural changes may be made without departing in any way from the spirit of the present invention.

What is claimed as new and desired to be protected by Letters Patent is set forth in the appended claims:

What is claimed is:

1. Apparatus for fabricating chip boards of fiber boards or cellulose material, comprising:

a press having a receiving end; and a press form station arranged upstream of the press and having a storage bin for retaining a material in the form of chips or fibers, said storage bin including an outlet end for discharge of material, and a conveyor belt arrangement extending from the outlet end of the storage bin to the receiving end of the press for forcing the material in the direction towards the receiving end of the press, said conveyor belt arrangement including a first section forming a vertical, funnel-shaped compaction zone, and a second arcuate section arranged downstream of the first section for deflecting the material along a curved path from a vertical disposition into a horizontal disposition, wherein the material in the press form station is aligned in a vertical plane to form a three-ply mat, with a center layer formed by randomly positioned material aligned to a major degree perpendicular to a conveying direction and trapped between outer layers formed by material substantially aligned parallel to the conveying direction, said three-ply mat being compacted during passage through the conveyor belt arrangement and transferred into the press while maintaining a pressure application; and control means for controlling a filling operation of the storage bin in response to a running speed of the conveyor belt arrangement.

2. The apparatus of claim 1 wherein the conveyor belt arrangement includes two endless conveyor belts.

3. The apparatus of claim 1 wherein the press is a double belt press.

4. The apparatus of claim 1 wherein the press is an intermittently operating press.

5. The apparatus of claim 1 wherein the press form station includes two endless belts in opposite disposition.

6. The apparatus of claim 1 wherein the storage bin has two opposite walls in the form of endless belts.

7. The apparatus of claim 1 wherein the conveyor belt arrangement has guide and deflection means which are adjustable in a horizontal plane in an area of the outlet end.

8. The apparatus of claim 1 wherein the storage bin has a filling opening, said endless belts being guided in the area of the filling opening and the outlet end around guide and deflection means which are adjustable in a horizontal plane.

9. The apparatus of claim 1 wherein the conveyor belt arrangement is so configured as to allow a continuous adjustment of a compaction angle in the area of the funnel-shaped compaction zone.

10. The apparatus of claim 1, and further comprising control means for regulating the speed of the conveyor belt arrangement.

11. The apparatus of claim 1 wherein the storage bin has accommodated therein vertical partitions to define compartments for receiving different material fractions.

12. The apparatus of claim 1 wherein the storage bin has a wall made of transparent material to allow monitoring of a filling level.

13. The apparatus of claim 2 wherein the conveyor belts are formed with a surface texture.

14. The apparatus of claim 13 wherein the surface texture is formed by ribs or grooves.

15. The apparatus of claim 1 wherein the press form station includes a sorting unit accommodated in the storage bin adjacent the outlet end.

16. The apparatus of claim 15 wherein the sorting unit includes a screen having apertures of multiple sizes.

* * * * *